Patented Oct. 27, 1931

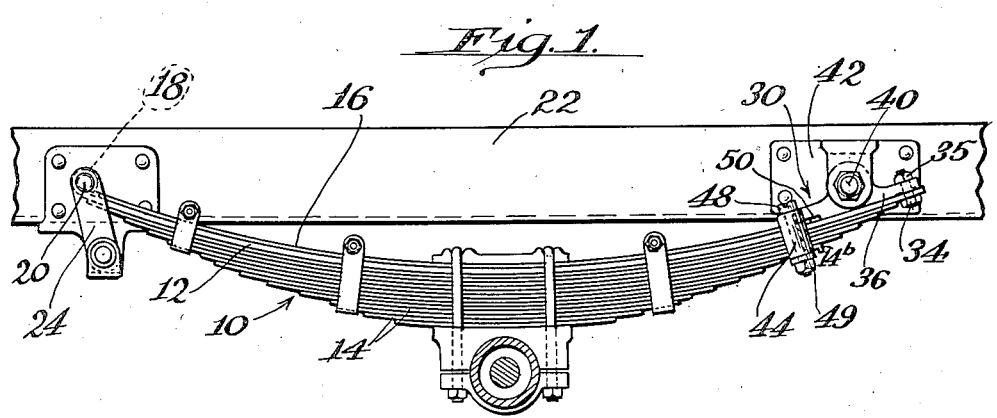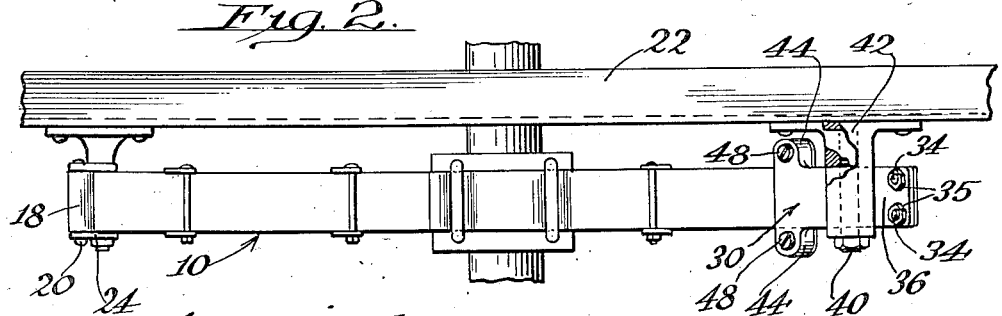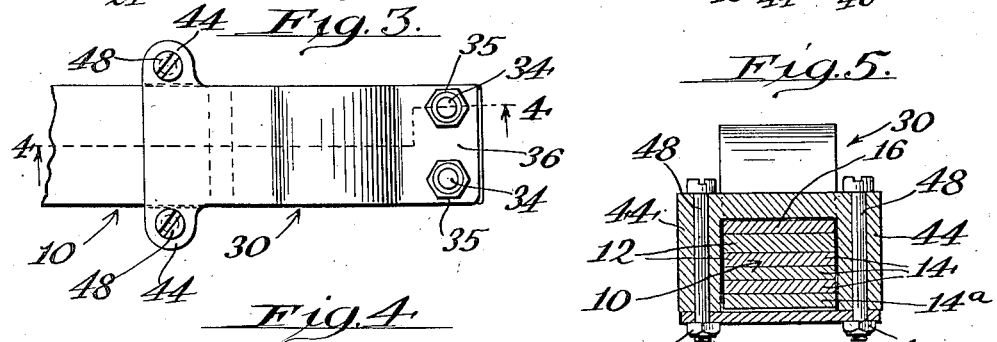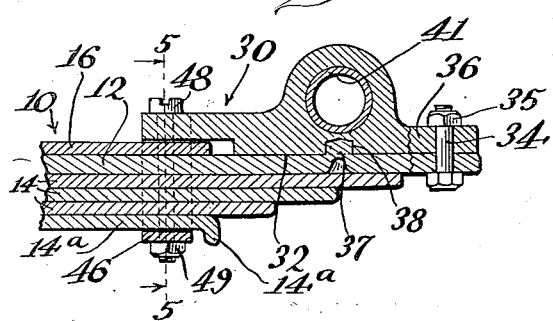

1,829,163

UNITED STATES PATENT OFFICE

WILLIAM J. SPRONG, OF ALHAMBRA, CALIFORNIA, ASSIGNOR TO UNITED STATES SPRING AND BUMPER COMPANY, INC., OF LOS ANGELES, CALIFORNIA, A CORPORATION OF CALIFORNIA

VEHICLE SPRING CONSTRUCTION

Application filed December 23, 1929. Serial No. 415,925.

This invention relates more specifically to means for connecting springs of a vehicle to its frame or body.

Certain types of motor vehicle drives, i. e. the so-called "Hotchkiss drive" are very desirable in as much that no radius or torque arms are employed, however, the rear springs in such constructions must serve as driving members in addition to supporting the load, resulting in subjecting the springs to considerable strain during starting or stopping, especially so when employed on vehicles such as heavy trucks, motor busses, etc.

Heretofore semi-elliptical springs known as eye-in-the-main-leaf have been universally employed in connection with the above type of drive. Although the springs may be amply strong to support the load and act as driving members, they very often break off at the eye on the forward or drive end of the spring. When a break in the main leaf occurs at this point the vehicle is put out of commission until the spring is repaired or replaced.

It is, therefore, the chief object of this invention to provide a device for connecting the driving end of the main leaf of a vehicle spring to the frame whereby all danger of breaking at the point of attachment will be practically eliminated.

Other objects and advantages will be apparent from the following description, reference being had to the accompanying drawings, in which:

Fig. 1 is a fragmentary side elevation of a motor vehicle frame and rear axle illustrating the improved means of connecting the spring to the frame;

Fig. 2 is a top plan view of Fig. 1, parts being broken away and shown in section;

Fig. 3 is an enlarged top plan view of the device connected to the spring;

Fig. 4 is a longitudinal sectional view taken on line 4—4 of Fig. 3;

Fig. 5 is a cross section taken on line 5—5 of Fig. 4.

Referring to the accompanying drawings, 10 generally designates a spring which consists of a main leaf 12, a plurality of usual leaves 14, and a rebound or snubbing leaf 16. An eye 18 is formed on the rear end of the main leaf through which extends a pin 20 for connecting this end of the spring to the frame 22 through the usual clevis or link 24.

The device constituting this invention consists of a member 30 preferably formed of cast steel mounted on and secured to the forward end of the main leaf 12. Member 30 has a flat bottom face 32 engaging the upper surface of the main leaf and is secured thereto by bolts 34 and nuts 35, the bolts extending through aligned openings in the main leaf and portion 36 projecting from the body of the member.

In order to prevent any lengthwise shifting of member 30 a lug 37 extends into a recess 38 formed in the underside of the body, this lug is formed by forging a portion of the leaf into the recess with a suitable tool after heating the end of the leaf.

The member 30 is connected to the frame 22 by the usual bolt or pin 40 passing through a bushed opening 41 formed in the body portion and threaded or otherwise connected to a standard bracket 42 secured to the frame.

Lugs 44 having flat inner faces engages each side of the spring leaves, the lower ends of which extend slightly below the underside of the leaf designated at 45, a strap or plate 46 is mounted on the lower end of the lugs and is secured thereto by bolts 48 and nuts 49, the bolts extending through openings formed in the lugs and plate.

Strap 46 and lugs 44 serve to hold the ends of the leaves 14 in assembled relation in a similar manner to the usual clips, the outer end of the spring 14ª being preferably bent over as indicated at 14ᵇ in order to prevent separation of the leaves in the event that the main leaf should break at any point in back of the lug or projection 37.

Leaf 16 acts as a snubber and is very desirable although not necessary. A recess 50 is formed in the underside of the member 30 to accommodate its movement during flexing of the spring.

From the foregoing it will be seen that the member 30 provides a firm and substantial means of connecting the spring to the frame and practically eliminates all danger of breakage at the drive end.

I claim:

1. In a vehicle spring construction including a main leaf, a plurality of leaves therebelow, a member formed of hardened metal having an opening therein for the reception of the usual pin projecting from the chassis of a vehicle, lugs formed on each side of said member and extending along the side faces of the main leaf and leaves therebelow, and a strap extending across the underside of the lowermost of the leaves below the main leaf, and means for securing said strap to said lugs.

2. In a vehicle spring construction including a main leaf, a plurality of leaves therebelow, a member formed of hardened metal having an opening therein for the reception of the usual pin projecting from the chassis of a vehicle, lugs formed on each side of said member and extending along the side faces of the main leaf and leaves therebelow, a strap mounted on said lugs, bolts extending through openings formed in said lugs, and nuts securing said strap to said lugs.

3. In a vehicle spring construction having a main leaf, a plurality of leaves therebelow, a member formed of hardened metal mounted on the main leaf and having a recess formed in its bottom face, a lug on the main leaf extending into said recess to hold said main leaf and member against sliding movement, bolts and nuts securing one end of said member to the main leaf, lugs formed on said member and projecting therebelow on each side of the main leaf and leaves therebelow, a strap mounted on said lugs, and means for securing said strap to said lugs.

4. In a vehicle construction comprising a main leaf, a snubbing leaf mounted on the main leaf, and a plurality of leaves disposed below the main leaf, a member formed of hardened metal mounted on the main leaf, said member having an opening therein for the reception of the usual bolt or pin projecting from the chassis of a vehicle, a recess formed in the bottom face to permit flexing of the snubbing leaf, and means for rigidly securing said member to said main leaf.

In testimony whereof I affix my signature.

W. J. SPRONG.